(12) United States Patent
Clark et al.

(10) Patent No.: US 11,106,116 B2
(45) Date of Patent: Aug. 31, 2021

(54) UNIVERSAL TRIPOD CLAMP SYSTEM

(71) Applicants: David Graham Clark, Lakewood, CO (US); Nathan Kanner, Denver, CO (US); Robert Borgen, Denver, CO (US); Gregory Lundeen, Westminster, CO (US)

(72) Inventors: David Graham Clark, Lakewood, CO (US); Nathan Kanner, Denver, CO (US); Robert Borgen, Denver, CO (US); Gregory Lundeen, Westminster, CO (US)

(73) Assignee: New Ideas Manufacturing LLC

( * ) Notice: Subject to any disclaimer, the term of this patent is extended or adjusted under 35 U.S.C. 154(b) by 0 days.

(21) Appl. No.: 16/589,925

(22) Filed: Oct. 1, 2019

(65) Prior Publication Data
US 2021/0096447 A1    Apr. 1, 2021

(51) Int. Cl.
*G03B 17/00* (2021.01)
*F16M 11/00* (2006.01)
*G03B 17/56* (2021.01)
*F16M 11/14* (2006.01)
*F16M 11/04* (2006.01)

(52) U.S. Cl.
CPC ......... *G03B 17/561* (2013.01); *F16M 11/041* (2013.01); *F16M 11/14* (2013.01)

(58) Field of Classification Search
USPC .............................. 396/428; 248/186.2, 187.1
See application file for complete search history.

(56) References Cited

U.S. PATENT DOCUMENTS

| | | | | |
|---|---|---|---|---|
| 2,145,584 | A * | 1/1939 | Chamberlain, Jr. ... | F16M 11/18 248/179.1 |
| 4,767,090 | A * | 8/1988 | Hartman ................ | F16M 11/16 24/273 |
| 7,290,740 | B2 * | 11/2007 | Joy ........................ | B60R 11/00 248/187.1 |
| 7,661,891 | B2 * | 2/2010 | Heibel .................. | F16M 13/022 396/428 |
| 9,016,658 | B2 * | 4/2015 | Barnard ................. | F16M 11/14 248/688 |
| 9,448,588 | B2 * | 9/2016 | Barnard ................. | F16M 11/40 |
| 2014/0103181 | A1 * | 4/2014 | Duerigen .............. | F16M 11/10 248/289.11 |

* cited by examiner

*Primary Examiner* — Clayton E. LaBalle
*Assistant Examiner* — Warren K Fenwick
(74) *Attorney, Agent, or Firm* — Johan Eide; Christopher Pilling; My Patent Guys

(57) ABSTRACT

A universal tripod clamp system is provided having a base member having a top side and a bottom side. The top side includes a plate receiving area configured to accept a mounting plate in conjunction with camera equipment. The bottom side includes an adapter receiving port having a first shape. A clamp is provided, wherein the clamp is configured to alter the plate receiving area. A universal adapter is provided, wherein the universal adapter is removably positioned in the adapter receiving port. The adapter is configured to receive a portion of a tripod head, such as a ball head. The adapter includes an opening having a second shape (pattern) configured to conform to the portion of the tripod head having the same shape (pattern).

10 Claims, 23 Drawing Sheets

UNIVERSAL TRIPOD CLAMP SYSTEM

BACKGROUND

1. Field of the Invention

The present invention relates to a universal tripod clamp for adjoining a camera to a tripod.

2. Description of Related Art

Over the years, manufacturers have been coming up with more creative ways to design their arca-style quick release clamps. Today, you can find everything from the most basic screwknob clamps to more advance systems that offer panning and sliding. Thanks to the versatility of the arca-style quick release system, it can be effectively used for pretty much any photographic need.

As a result, there are many different products on the market for all types of camera gear. The problem is that sometimes it can be hard to mix and match products from different brands and manufacturers due to compatibility issues, as some companies change the standard size of the plate. Also, different manufactures use different tripod head ball patterns, which prevents the photographer from using their area-style quick release system with different tripod heads.

Consequently, there is a need for a universal tripod clamp that can be used with different brands and manufacturers.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the present invention to provide an arca-style quick release system which would be compatible with any ball head, allowing the users to switch tripod heads easily. This wide-ranging compatibility is achieved by having a set of interchangeable pieces which mimic the connection pattern used on each specific ball head. We call these pieces universal adapters and they interface with both the clamp and the tripod head. The adapters are easily swapped out to fit properly with whichever tripod head the photographer uses. The adapters fit snugly in a cavity underneath the clamp and allow it to be securely tightened into place.

It order to do so, a universal tripod clamp system is provided, comprising a base member having a top side and a bottom side, wherein the top side includes a plate receiving area configured to accept a mounting plate in conjunction with camera equipment, and wherein the bottom side includes an adapter receiving port having a first shape; a clamp configured to alter the plate receiving area; and, an adapter removably positioned in the adapter receiving port, wherein the adapter is configured to receive a portion of a tripod head.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

Figure 1:
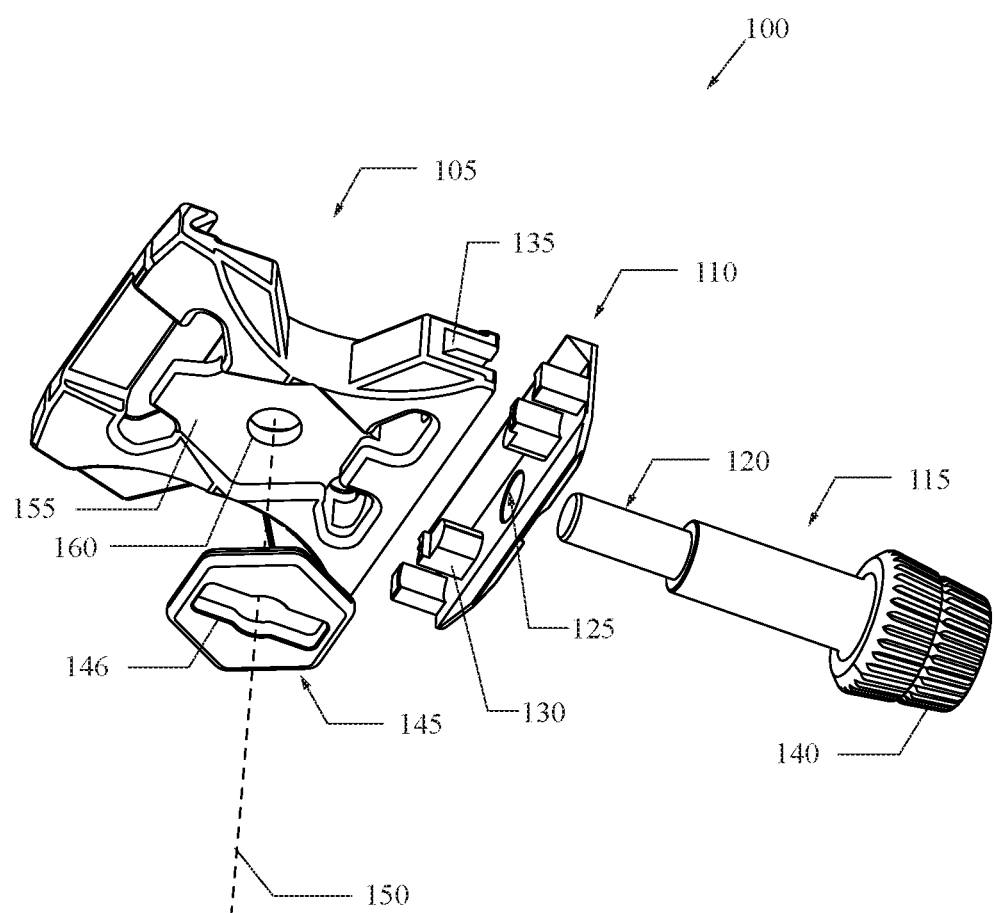
FIG. 1 shows an exemplary exploded perspective view of one embodiment of the universal tripod system.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

As shown in FIGS. 1, 2, 3A and 3B a universal tripod clamp system 100 is provided having a base member 105, a clamp 110, and an adapter 145. The universal tripod clamp system 100 is designed for configurable use with different commercially available brands of various articles without limitation, such as tripods and camera equipment. Although the present embodiment illustrated is configured for use with commercially available tripod and camera equipment, the adapter 145 of the universal tripod clamp system 100 may be configured to match any article desired by the user in any industry. For example, the universal tripod clamp system 100 is configurable to adjoin to any commercially available tripod ball head by placing an embodiment of the adapter 145 that is configured to match a portion of the commercially available article, such as a tripod head. In some embodiments, the portion of the article is a tripod ball head 305, wherein the ball head 305 is configured to be attached to tripod 310, best seen in FIG. 23. More specifically, the ball head includes a specific connection pattern determined by the brand or manufacturer, wherein the specific connection pattern matches the third opening 146 of the adapter. Various adapters are provided, as illustrated in FIGS. 4A-D, 5A-B, and 6A-C having specific connection patterns, i.e. third openings 145), configured to match the specific connection patterns of the various ball heads of the brand or manufacturer. As an example, the adaptor illustrated in FIGS. 4A-B has a connection pattern configured to match ball heads provided by Really Right Stuff® and Benro®, the adaptor illustrated in FIGS. 4C-D has a connection pattern configured to match ball heads provided by LVG®, the adaptor illustrated in FIGS. 5A-B has a connection pattern configured to match ball heads provided by Manfrotto®, and the adaptor illustrated in FIGS. 6A-C has a connection pattern configured to match ball heads provided by Really Right Stuff®. The various adapters are configured to be easily swapped out when needed for use with the different brands. It should be understood that other adapters have additional connection patterns configured to match with connection patterns of additional brands may be provided without departing from the scope and spirit of the invention.

Figure 2:
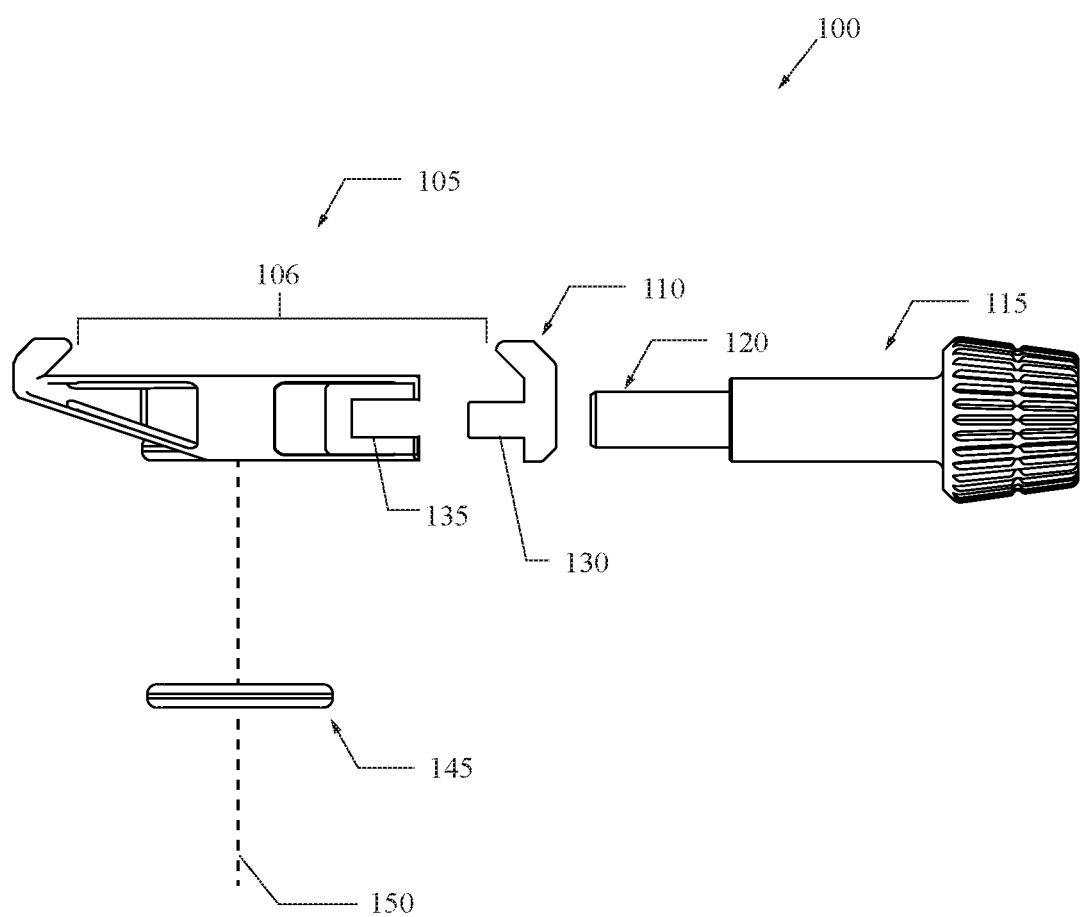
FIG. 2 shows an exemplary exploded right view of one embodiment of the universal tripod system.
Figure 3A:
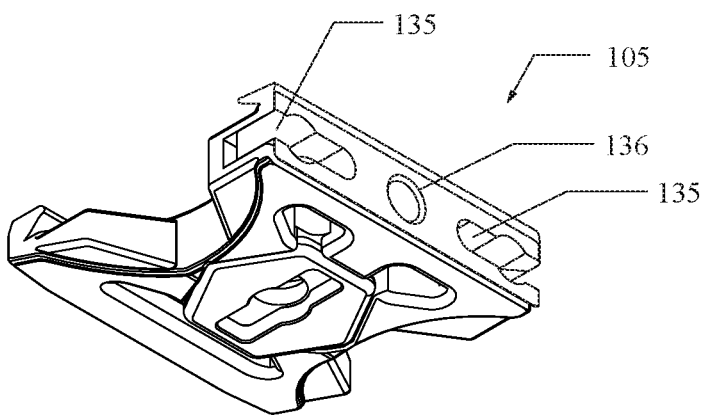
FIG. 3A shows an exemplary perspective view of one embodiment of the base member of the universal tripod system.
Figure 3B:
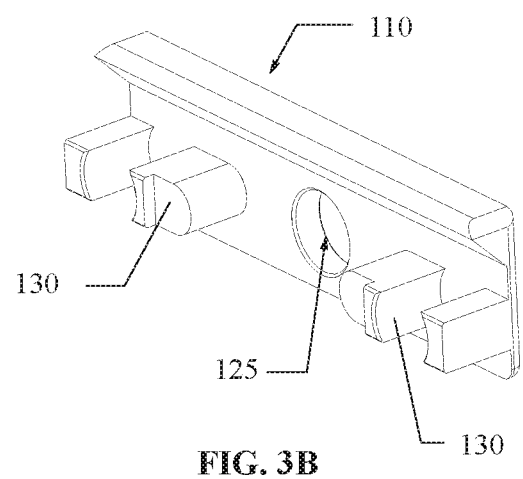
FIG. 3B shows an exemplary perspective view of one embodiment of the clamp of the universal tripod system.
Figure 4A:
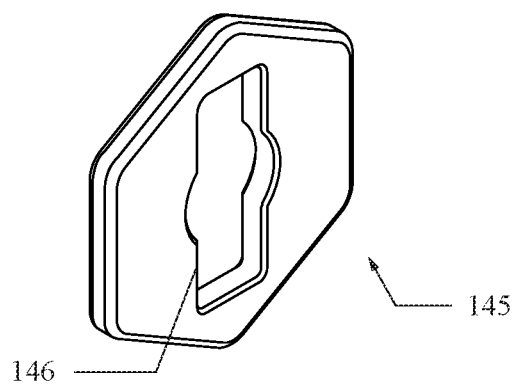
FIG. 4A shows an exemplary perspective view of one embodiment of the adapter of the universal tripod system.
Figure 4C:
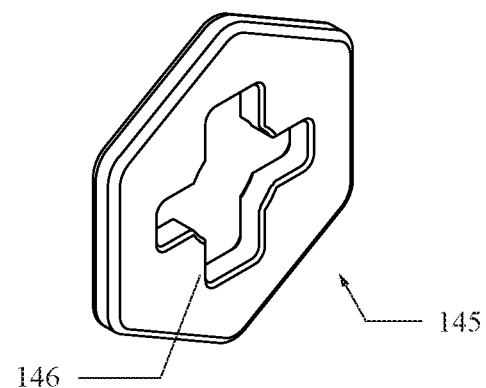
FIG. 4C shows an exemplary perspective view of one embodiment of the adapter of the universal tripod system.
Figure 4B:
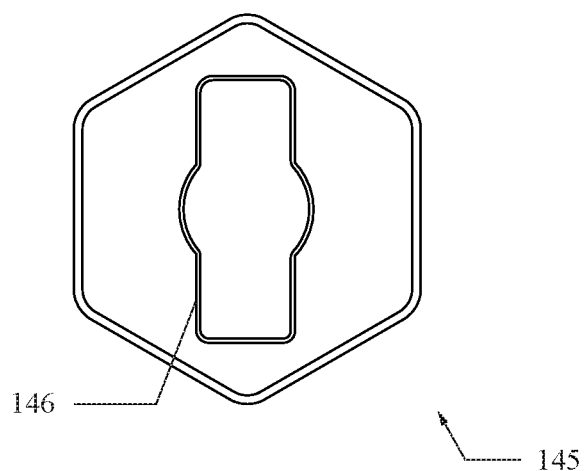
FIG. 4B shows an exemplary front view of one embodiment of the adapter of the universal tripod system.
Figure 4D:
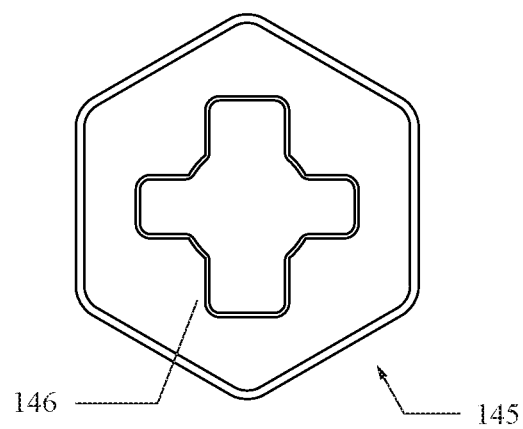
FIG. 4D shows an exemplary front view of one embodiment of the adapter of the universal tripod system.
Figure 5A:
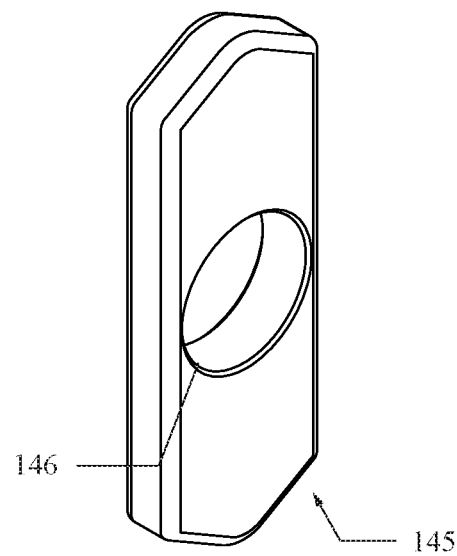
FIG. 5A shows an exemplary perspective view of one embodiment of the adapter of the universal tripod system.
Figure 5B:
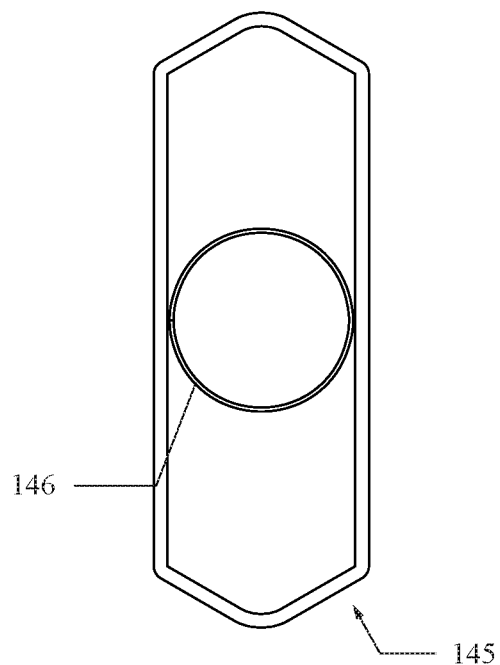
FIG. 5B shows an exemplary front view of one embodiment of the adapter of the universal tripod system.
Figure 23:
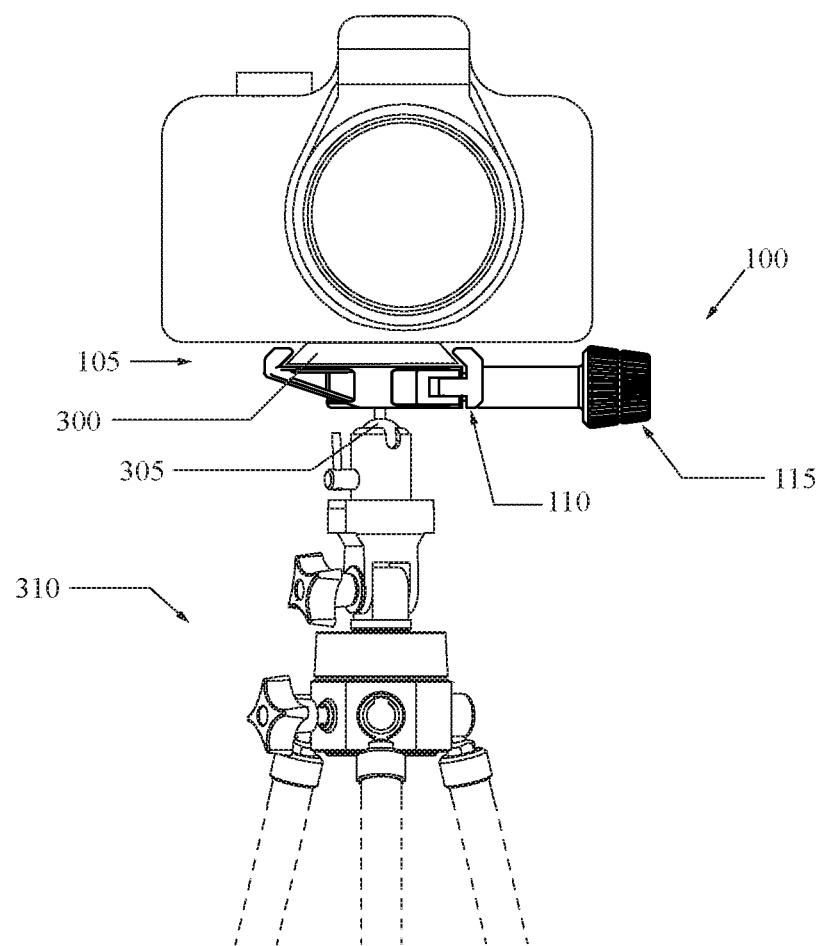
FIG. 23 shows an exemplary perspective view of the universal tripod system utilized with camera equipment.

In further description of the base member 105, the base member 105 has a top surface and a bottom surface. For the purpose of this disclosure the top surface and bottom surface may be referred to as the top side and bottom side respectively. The bottom surface of the base member 105 is designed to be in proximity to the article, such as a commercially available tripod or camera equipment in which the universal tripod clamp system 100 is being adjoined to. The top surface including a plate receiving area 106, as shown in FIG. 2. The plate receiving area 106 is configured to substantially match a mounting plate 300 of a commercially available camera, tripod, or camera equipment, as shown in FIG. 23. Common mounting plates typically comprise a square or rectangular member with biasing member adjoined to the perimeter edge of the mounting plate, such as an angled edge or dovetail mount. Exemplary mounting plates may further comprise quick-releases, fasteners, threaded ports, slots, linear guide systems, textured surfaced, clamps, and other assessor members.

In some embodiments, the base member 105 further comprises a first opening 160 disposed centrally and extending through the base member 105 and a chamfer 170. In some embodiments, as shown in FIG. 1, the center of the first opening 160 is aligned with an adapter axis 150, defining the center of the adapter 145. The bottom surface of the base member 105 further comprises an adapter receiving port 155 configured to receive the adapter 145. During assembly of some embodiments of the universal tripod clamp system 100, a fastener is passed through the first opening 160 and/or the third opening 146 of the adapter 145 and into a protrusion, a port, or a portion of the commercially available article, such as a tripod head.

As shown in FIGS. 1 and 2, the base member 105 and the clamp 110 may further comprise a clamp port 135 and a clamp alignment member 130, respectively. The clamp port 135 and the clamp alignment member 130 serve to align the clamp 110 properly in relation to the plate receiving area 106 upon the top surface of the base member 105. The clamp 110 further includes a second opening 125 configured to substantially match the cross-sectional shape of an adjustment fastener 120. Joining the clamp 110 to the base member 105 is an adjustment arm 115 having an adjustment fastener 120. The adjustment fastener 120 is configured to engage the adjustment arm port 136 positioned upon and extending unto the base member 105. In some embodiments, the adjustment arm port 136 and the adjustment fastener 120 are threaded to match during the engagement. During assembly, the user aligns the adjustment arm 115 through the second opening 125 of the clamp 110 and into the adjustment arm port 136. The user may then manually engage the adjustment arm 115 to move the clamp 110 in a linear direction, thereby altering the plate receiving area 106. During assembly, directional movement of the clamp 110 relative to the base member 105 is dictated by the clamp alignment member 130 traveling along the clamp port 135. In some embodiments, the clamp alignment member 130 is embodied as at least one protrusion having at least one shape of the shape set and extending outward from the clamp 110. In the same embodiments, the clamp port 135 may be substantially shaped to match the quantity and shape of the at least one protrusion. It should be understood that the description of the clamp features and components are merely an example, and other type of clamps or equivalent devices may be utilized, including but not limited to lever clamps, screw knobs, or similar.

Figure 6A:
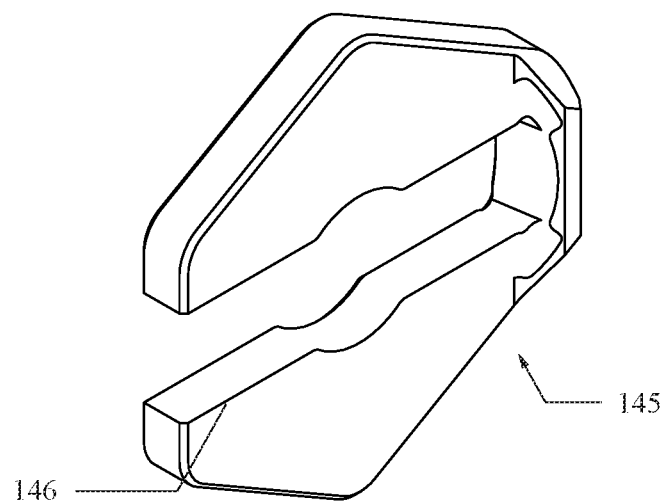
FIG. 6A shows an exemplary perspective view of one embodiment of the adapter of the universal tripod system.
Figure 6B:
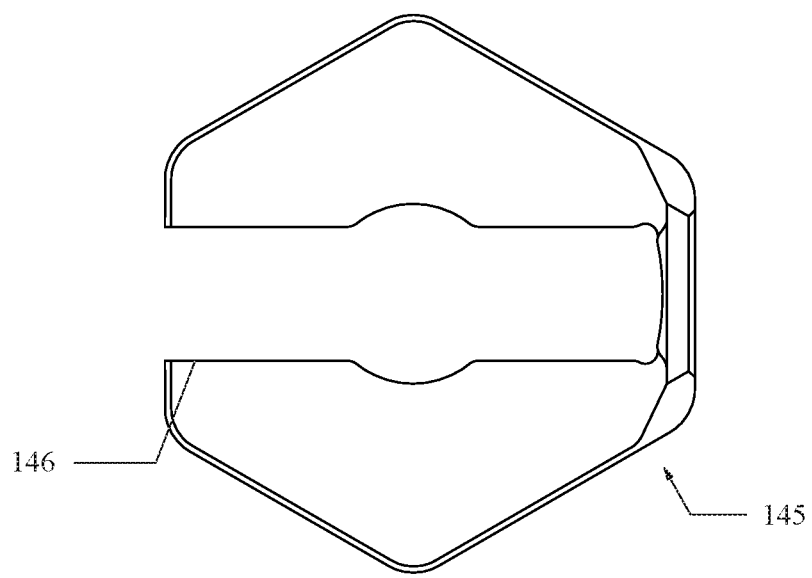
FIG. 6B shows an exemplary front view of one embodiment of the adapter of the universal tripod system.
Figure 6C:
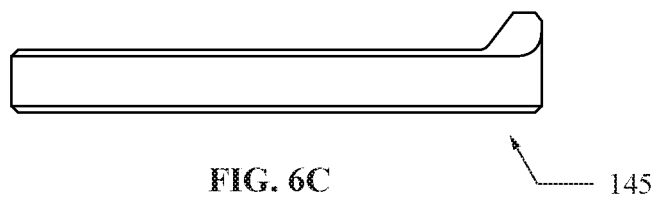
FIG. 6C shows an exemplary bottom view of one embodiment of the adapter of the universal tripod system.
Figure 7:
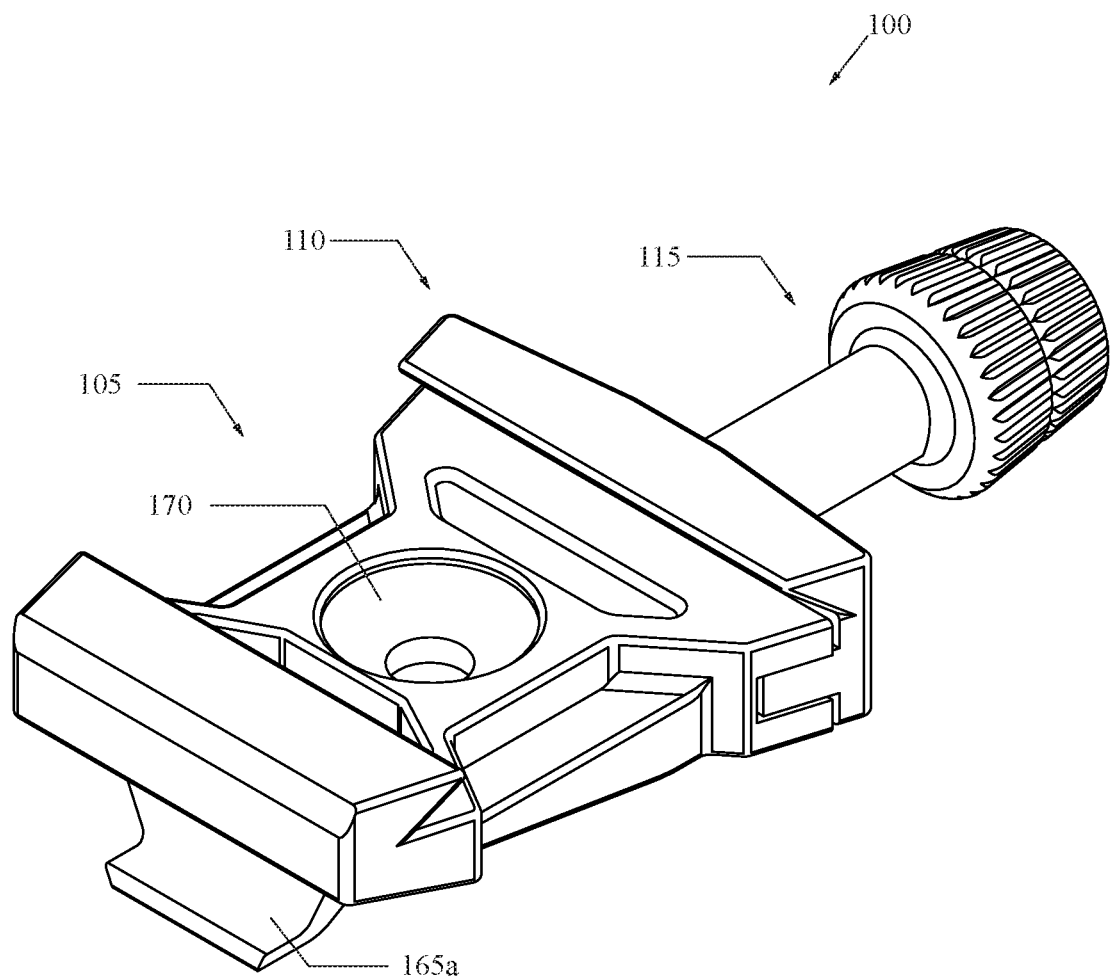
FIG. 7 shows an exemplary perspective view of one embodiment of the universal tripod system.
Figure 8:
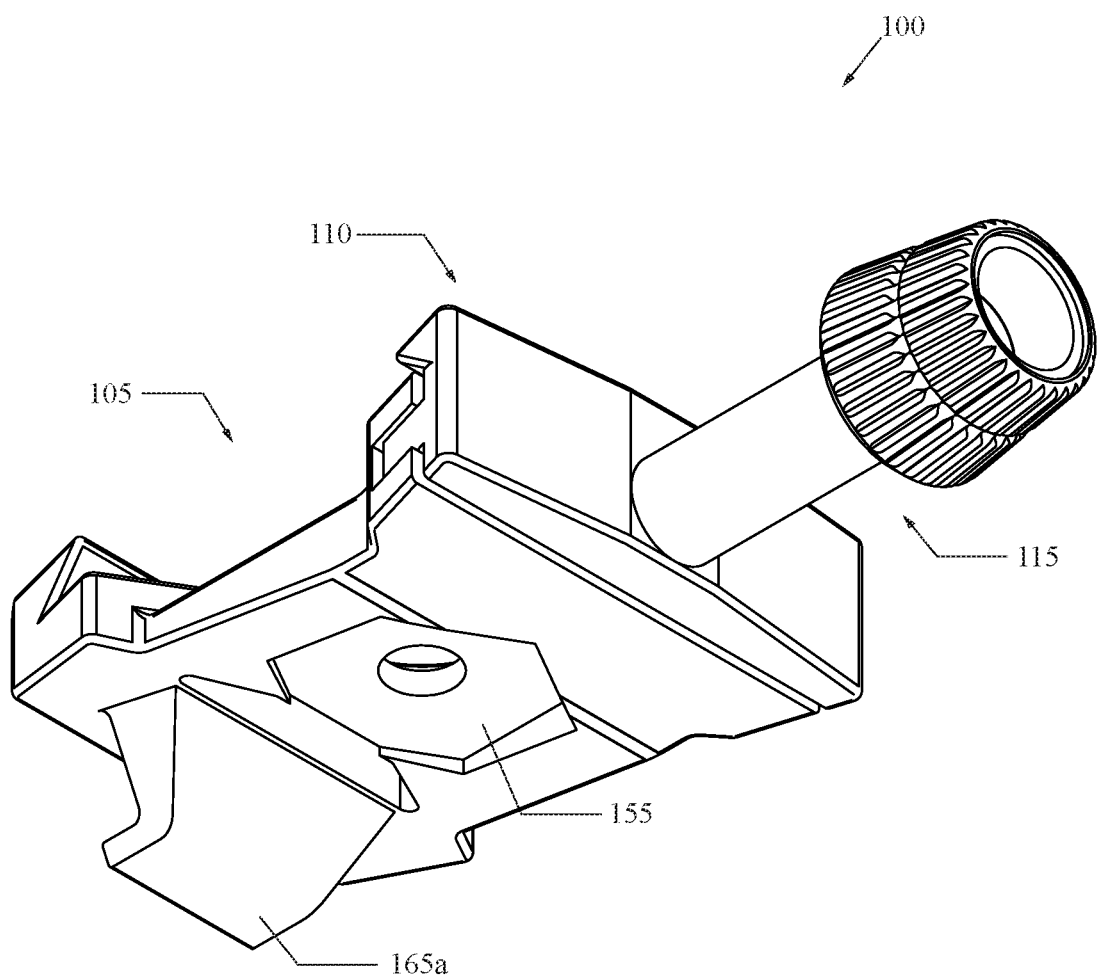
FIG. 8 shows an exemplary perspective view of one embodiment of the universal tripod system.

As shown in FIGS. 1, 4A-4D, 5A-5B, and 6A-6B the size and shape of the adapter 145 and/or respective adapter receiving port 155 may be further configured to match a product of a commercially available article, such as a tripod or camera equipment. The shape and size of the adapter receiving port 155 is configured to substantially match the shape and size of the adapter 145. In the present embodiment, the adapter 145 is shown to have an exemplary hexagon pattern allowing for guided alignment of the adapter 145 to the adapter receiving port 155 by the user during assembly. The adapter 145 includes a third opening 146. In some embodiments, the third opening 146 is configured to extend through the adapter 145 and to substantially match a portion of the commercially available article, such as a tripod head, and more specifically the ball head of the tripod head. In other embodiments, the adapter 145, the third opening 146 and/or the adapter receiving port 155 can be a shape, by way of non-limiting example, of a shape set consisting of: a honeycomb shape, a square, a triangle, a rectangle, a hexagon, an octagon, an oval, a shape having at least one side, any combination thereof, or any shape matching the ball head of a tripod head for a number of manufactures. One skilled in the art will recognize other proprietary shapes unique to commercially available brands of camera equipment and tripods that are suitable for configurations of the adapter 145, the third opening 146, and/or adapter receiving port 155. As shown in FIGS. 6A-6B, the adapter 145 may further comprise a protrusion 147. The protrusion 147 aiding in alignment and movement of the universal tripod clamp system 100 upon curved article, such as a tripod or camera equipment.

Figure 9A:
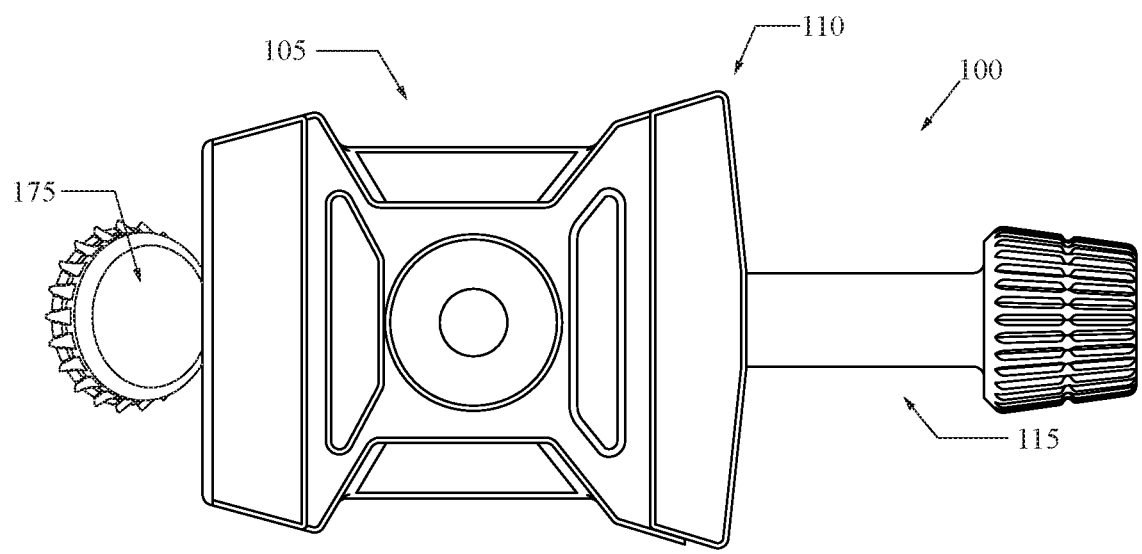
FIG. 9A shows an exemplary top view of one embodiment of the universal tripod system.
Figure 9B:
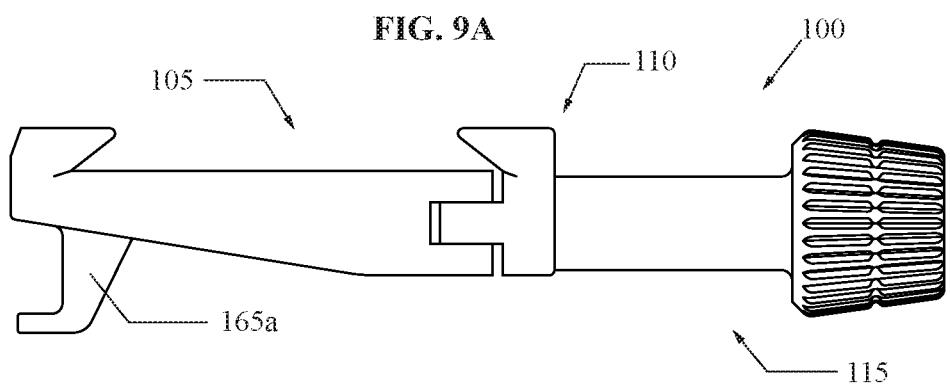
FIG. 9B shows an exemplary right view of one embodiment of the universal tripod system.
Figure 9C:
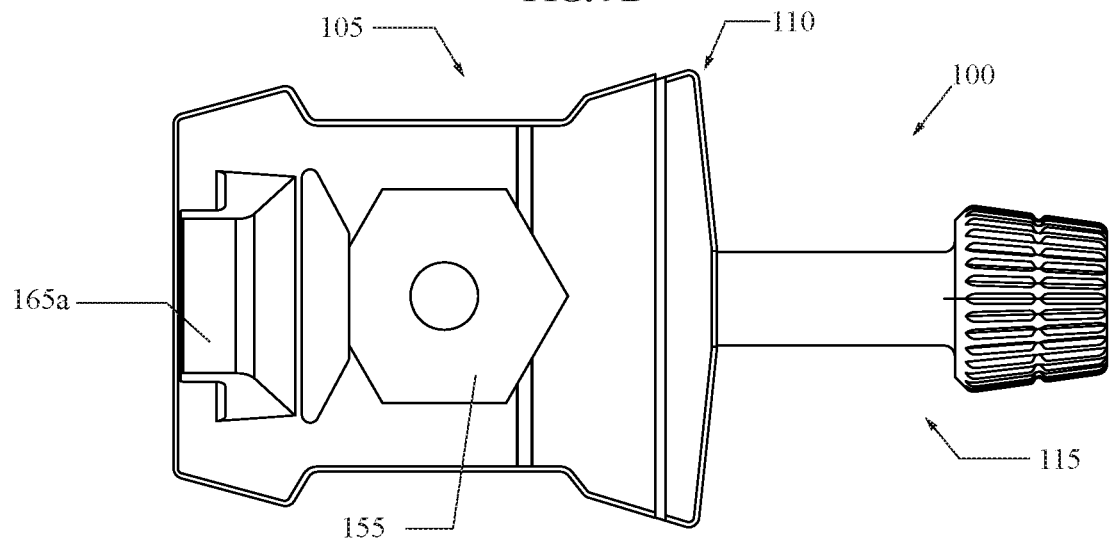
FIG. 9C shows an exemplary bottom view of one embodiment of the universal tripod system.
Figure 10:
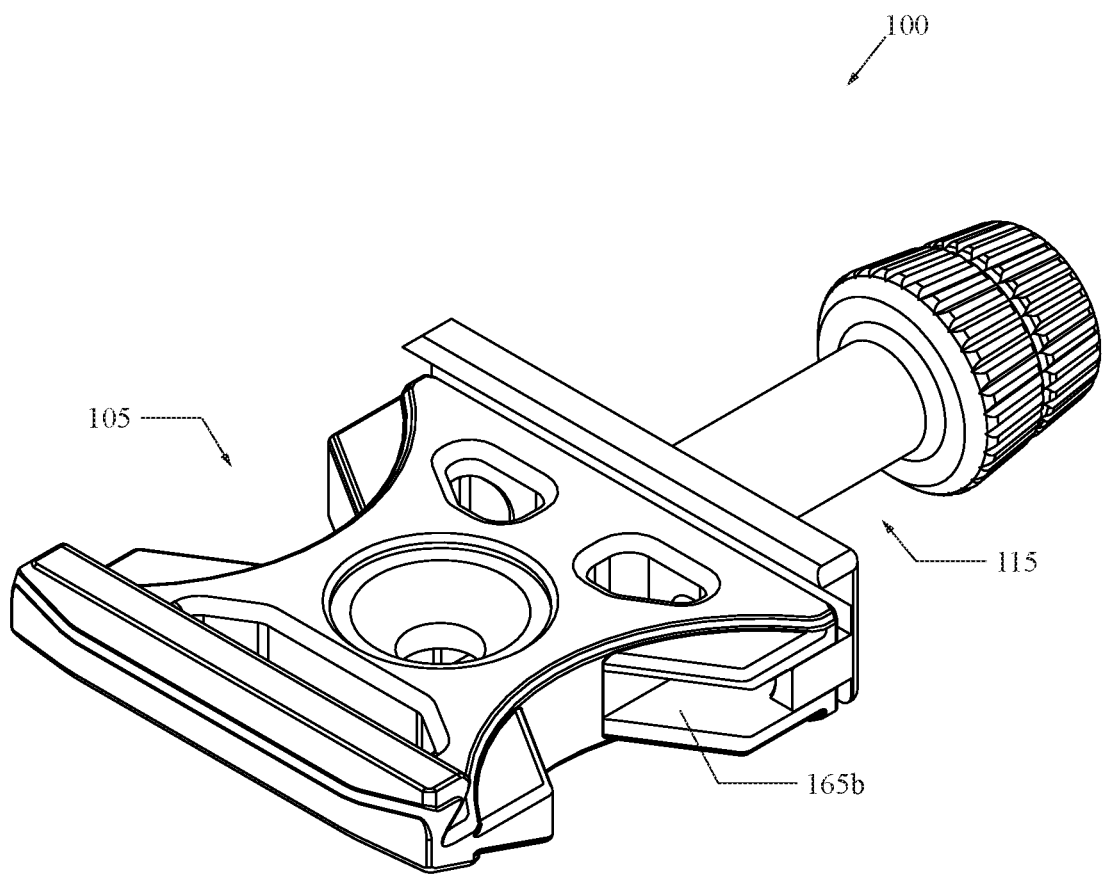
FIG. 10 shows an exemplary perspective view of one embodiment of the universal tripod system.
Figure 11:
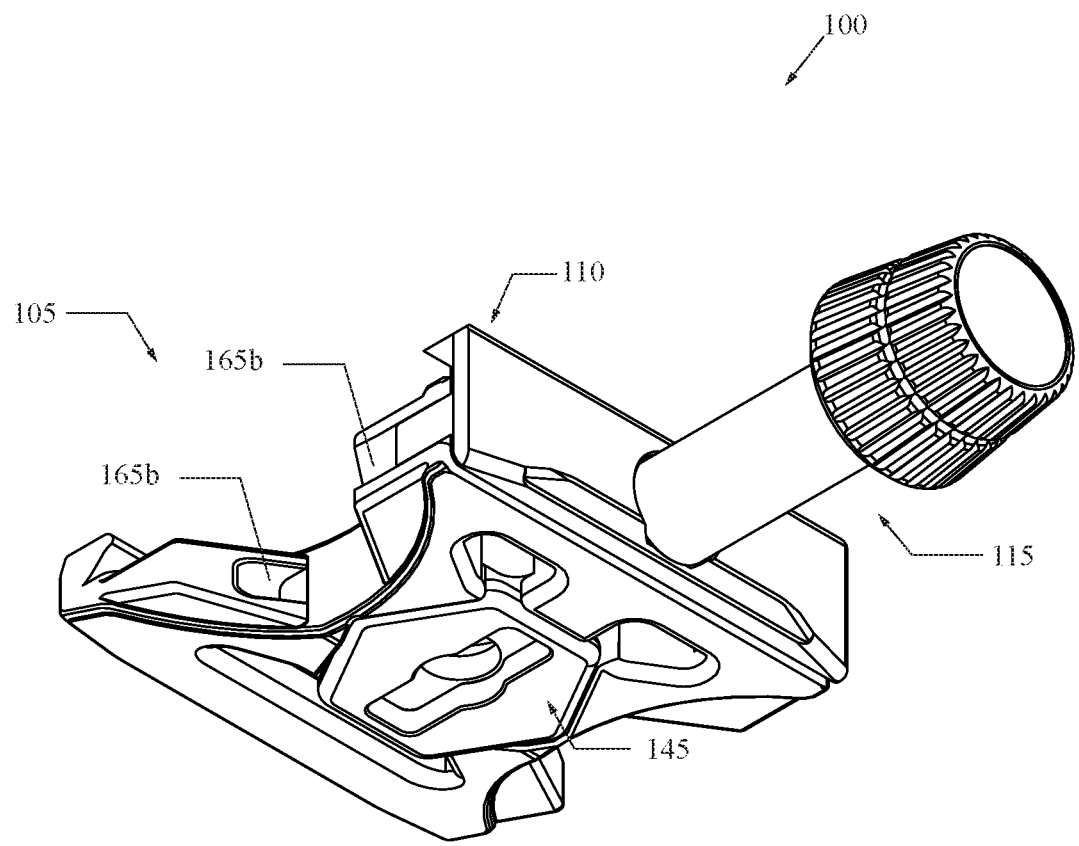
FIG. 11 shows an exemplary perspective view of one embodiment of the universal tripod system.
Figure 12A:
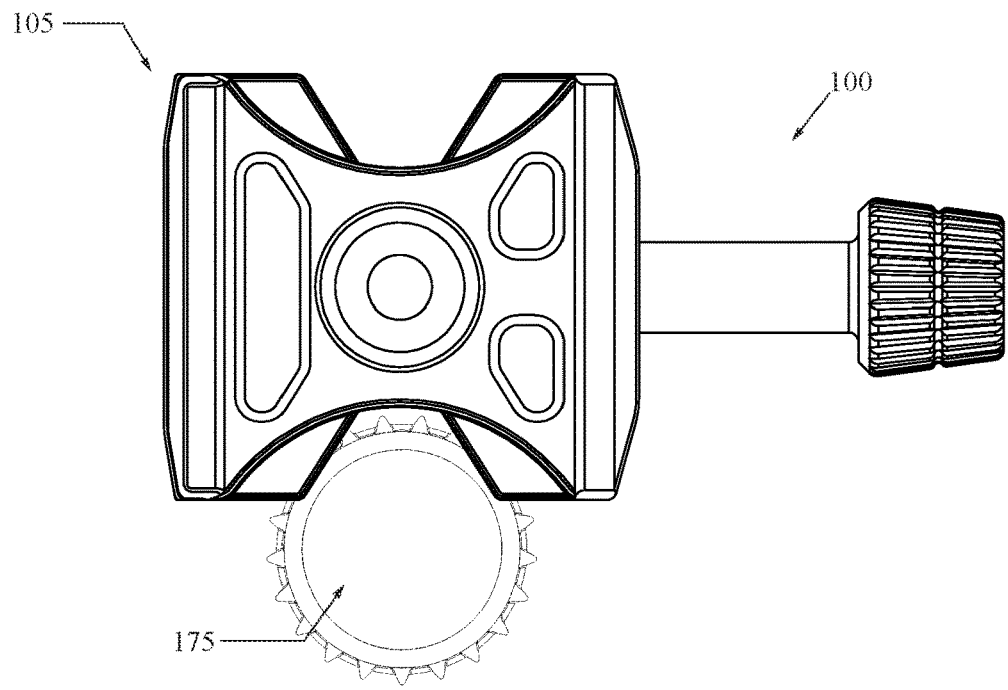
FIG. 12A shows an exemplary top view of one embodiment of the universal tripod system.
Figure 12B:
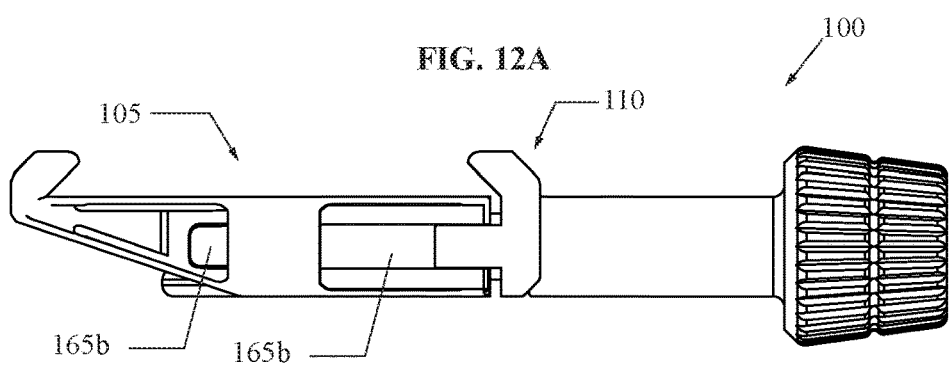
FIG. 12B shows an exemplary right view of one embodiment of the universal tripod system.
Figure 12C:
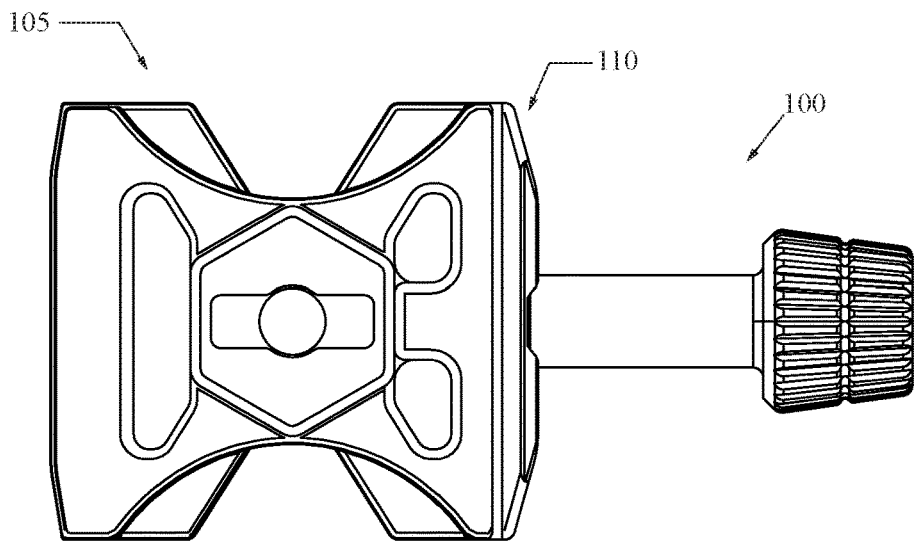
FIG. 12C shows an exemplary bottom view of one embodiment of the universal tripod system.
Figure 13:
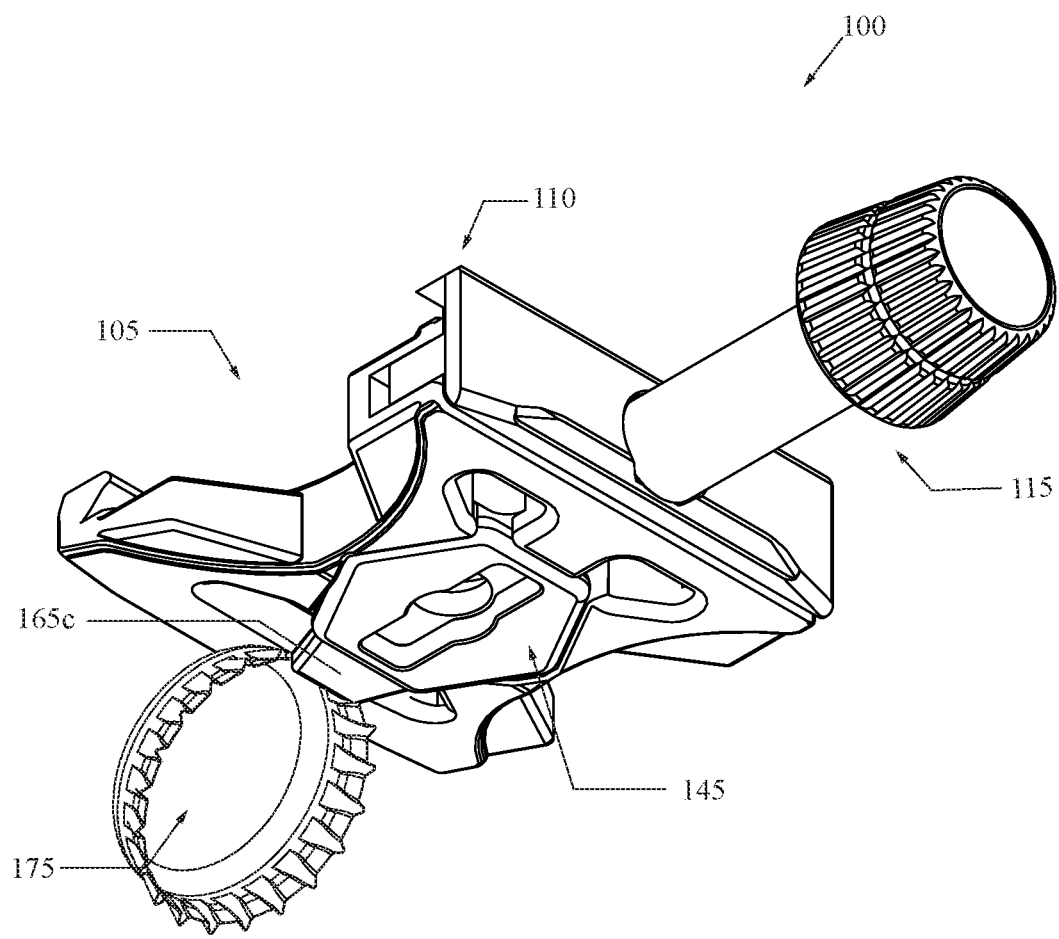
FIG. 13 shows an exemplary perspective view of one embodiment of the universal tripod system.
Figure 14A:
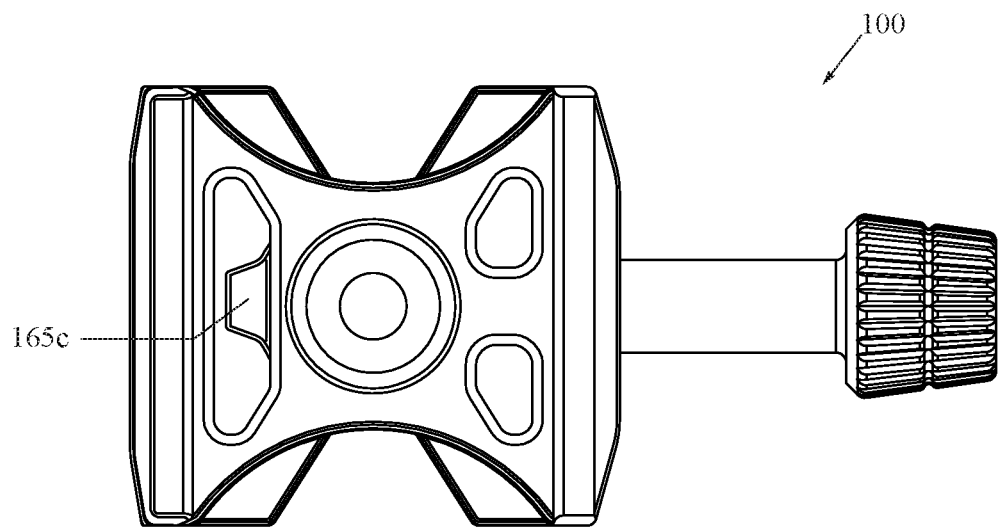
FIG. 14A shows an exemplary top view of one embodiment of the universal tripod system.
Figure 14B:
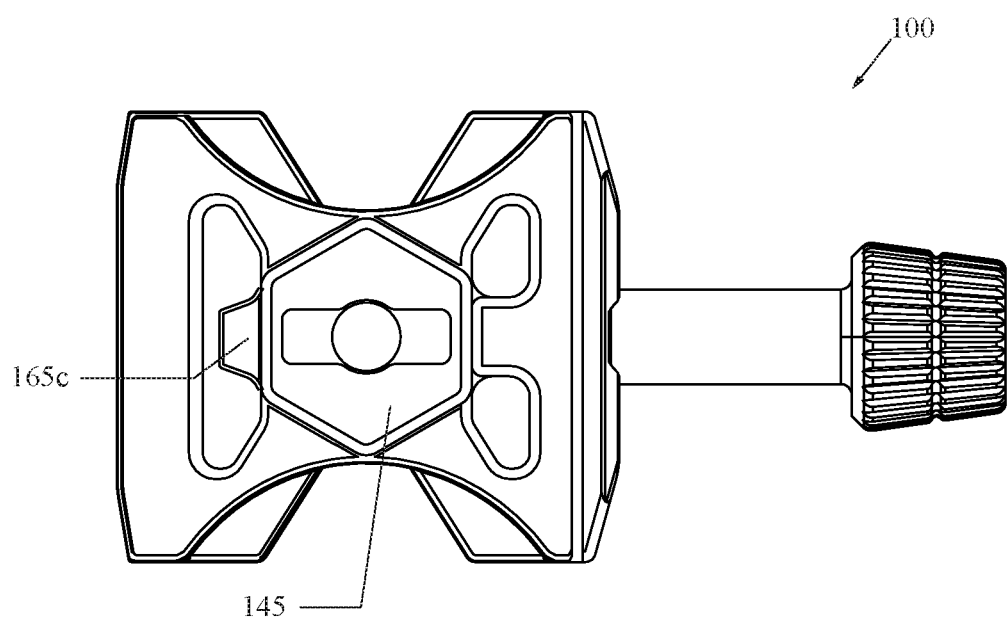
FIG. 14B shows an exemplary bottom view of one embodiment of the universal tripod system.
Figure 15A:
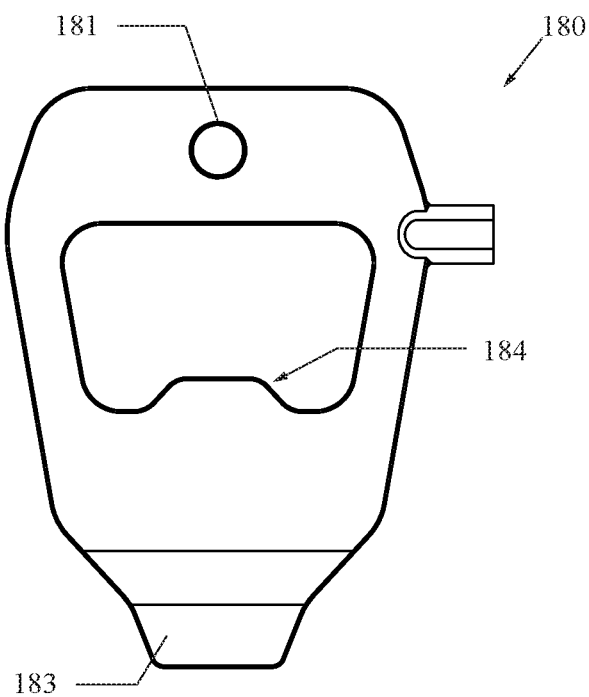
FIG. 15A shows an exemplary front view of one embodiment of the adjustment key of the universal tripod system.
Figure 15B:
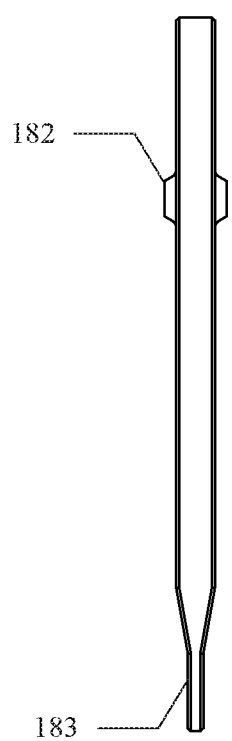
FIG. 15B shows an exemplary left view of one embodiment of the adjustment key of the universal tripod system.
Figure 15C:
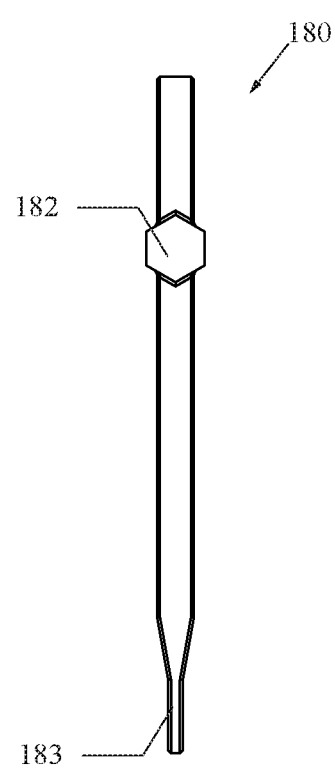
FIG. 15C shows an exemplary right view of one embodiment of the adjustment key of the universal tripod system.

As illustrated in FIGS. 7, 8, 9A-9C, 10, 11, 12A-12C, 13, 14A, and 14B, in some embodiments, the base member 105 may further comprise a bottle opener. The base member 105 may comprise, by way of non-limiting example, a hooked bottle opener 165a, a side-mounted bottle opener 165b, and a tab bottle opener 165c. In embodiments having a hooked bottle opener 165a, the universal tripod clamp system 100 is manually engaged by the user to hook the edge of a bottle cap 175 (as shown in FIG. 9A), thereby opening a bottle. In embodiments having a side-mounted bottle opener 165b, the universal tripod clamp system 100 is manually engaged by the user to hook the edge of the bottle cap 175 (as shown in FIG. 12A), thereby opening the bottle. In embodiments having a tab bottle opener 165c, the universal tripod clamp system 100 is manually engaged by the user to hook the edge of the bottle cap 175 (as shown in FIG. 13), thereby opening the bottle.

Figure 16A:
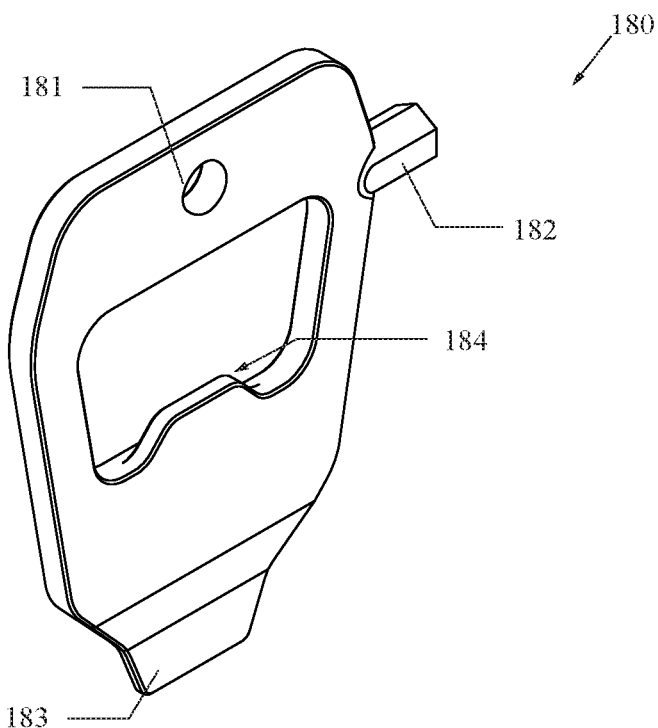
FIG. 16A shows an exemplary perspective view of one embodiment of the adjustment key of the universal tripod system.
Figure 16B:
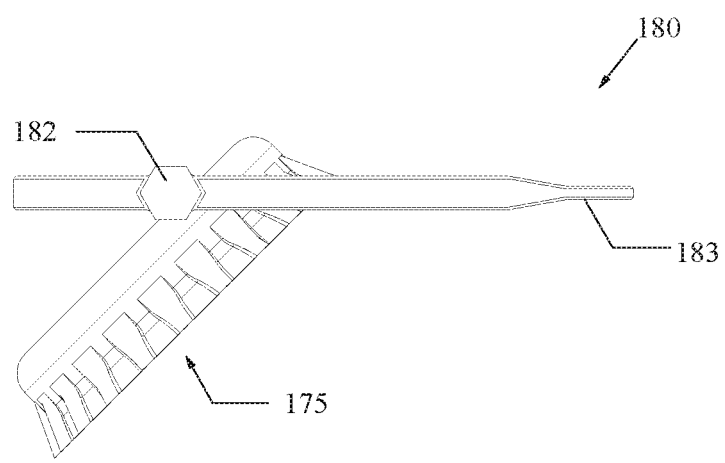
FIG. 16B shows an exemplary right view of one embodiment of the adjustment key of the universal tripod system.

In some embodiments, the universal tripod clamp system 100 further comprises an external texture 140. For example, the adjustment arm 115 may comprise the external texture 140 to grip a hand of the user. In yet another example, the base member 105 may comprise the external texture 140 to interface with the mounting plate within the plate receiving area 106. In some embodiments, the external texture 140 further comprises at least one member of a texture set consisting of: indentations, extrusions, knurling, a rough surface, and bumps, In some embodiments, as shown in FIGS. 15A-15C, 16A, 16B, 23 the universal tripod clamp system 100 may further include an adjustment key 180 having a top surface, a bottom surface, and a perimeter edge. The adjustment key 180 is configured to interface with one or more components of universal tripod clamp system 100 during assembly and/or adjustment, such as plate 300. The adjustment key 180 having a fourth opening 181, an engagement member 182, a first key tab 184, a second key tab 183 and a fifth opening 185. The fifth opening 185 extending through the adjustment key 180 from the top surface to the bottom surface. The first key tab 184 located within the fifth opening 185. The second key tab 183 and the engagement member 182 are disposed along the perimeter edge of the adjustment key 180. The first key tab 184, the second key tab 183 and the engagement member 182 may comprise at least one member of a key set, by way of non-limiting example, including: a lock key, a screwdriver tip, an Allen wrench or hex key, a knife, a magnet, a hook, a carabiner, an elastic member, a spring-loaded member or any combination thereof. As shown in FIG. 16B, first key tab 184 is within the fifth opening 185 of the adjustment key 180 and may be configured as a bottle opener. During exemplary use, the user manually engages the adjustment key 180 to interface the first key tab 184 with the edge of the bottle cap 175, therein opening the bottle.

Figure 17A:
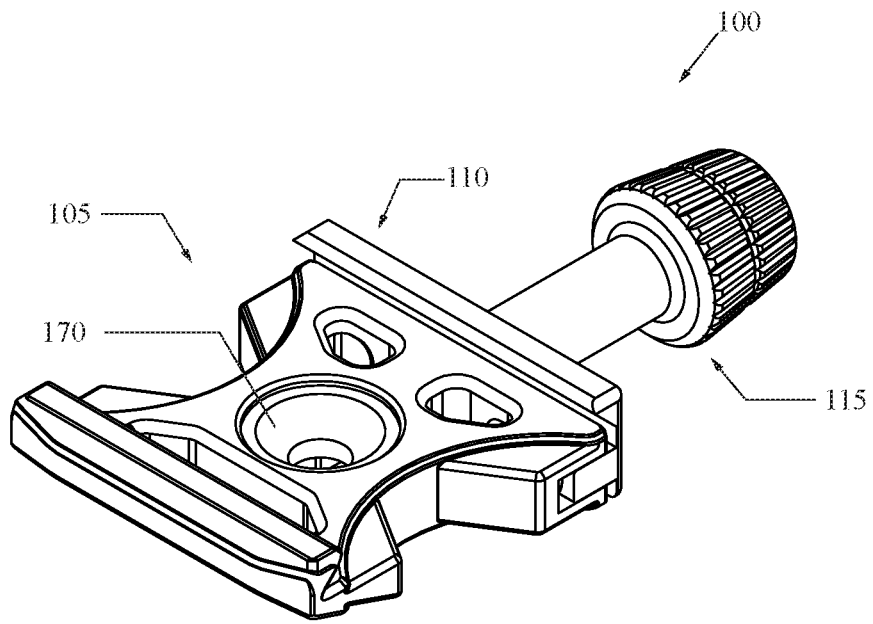
FIG. 17A shows an exemplary perspective view of one embodiment of the universal tripod system.
Figure 17B:
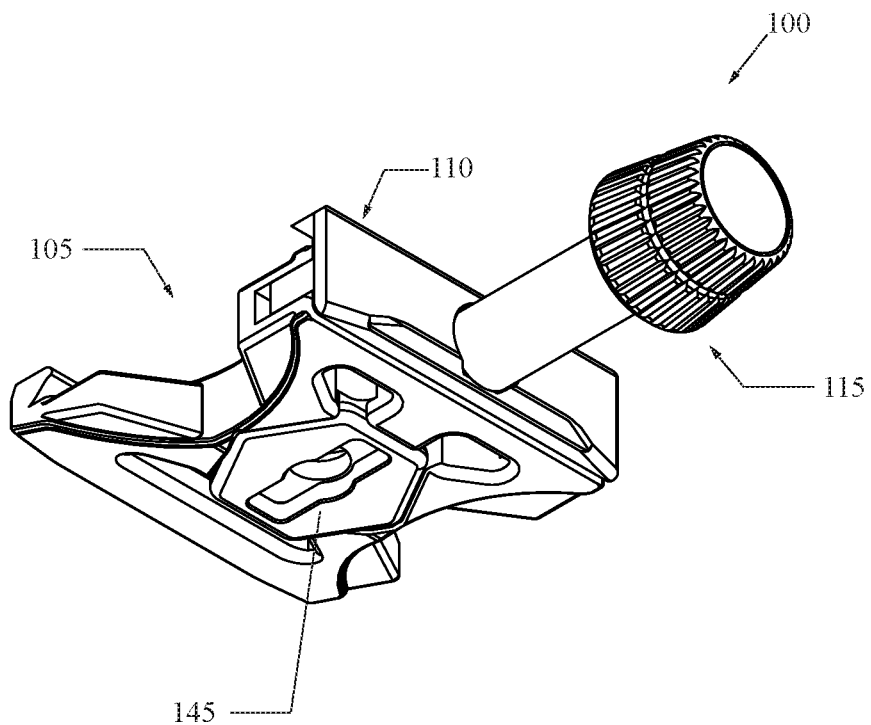
FIG. 17B shows an exemplary perspective view of one embodiment of the universal tripod system.
Figure 18A:
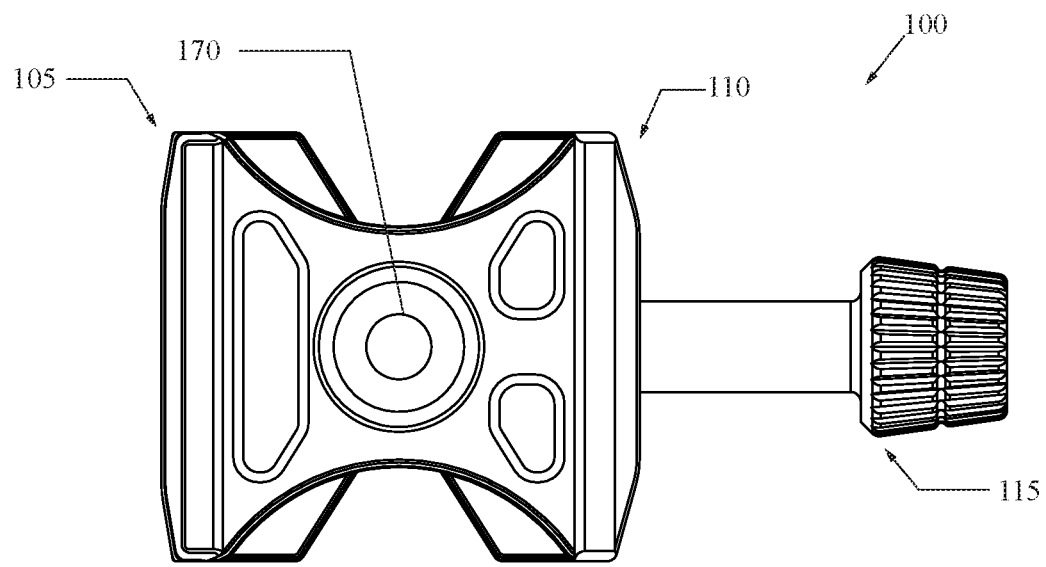
FIG. 18A shows an exemplary top view of one embodiment of the universal tripod system.
Figure 18B:
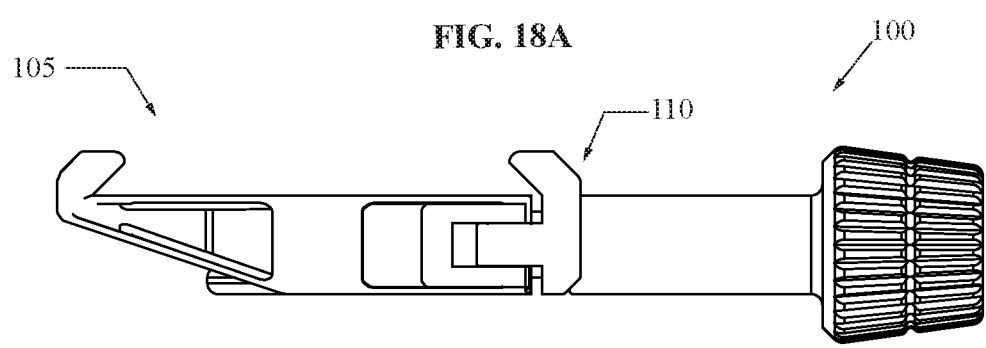
FIG. 18B shows an exemplary right view of one embodiment of the universal tripod system.
Figure 18C:
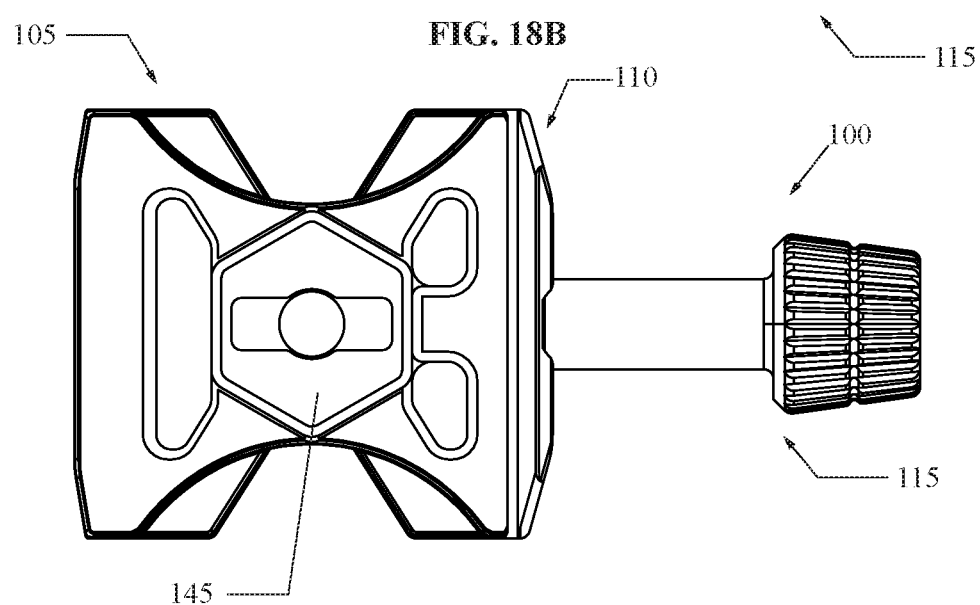
FIG. 18C shows an exemplary bottom view of one embodiment of the universal tripod system.
Figure 19A:
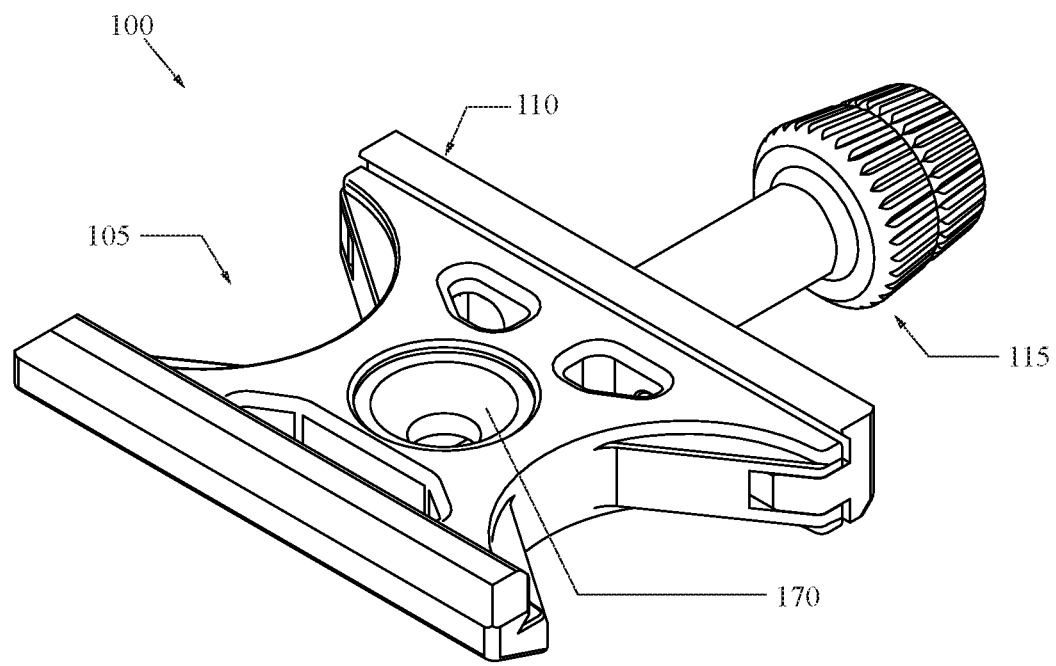
FIG. 19A shows an exemplary perspective view of one embodiment of the universal tripod system.
Figure 19B:
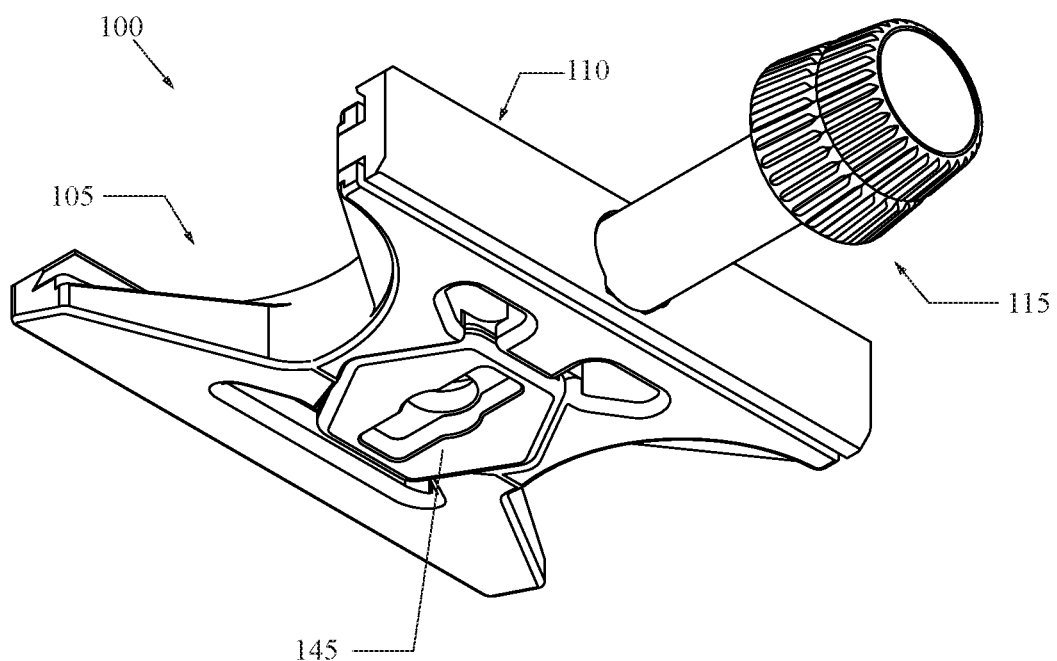
FIG. 19B shows an exemplary perspective view of one embodiment of the universal tripod system.
Figure 20A:
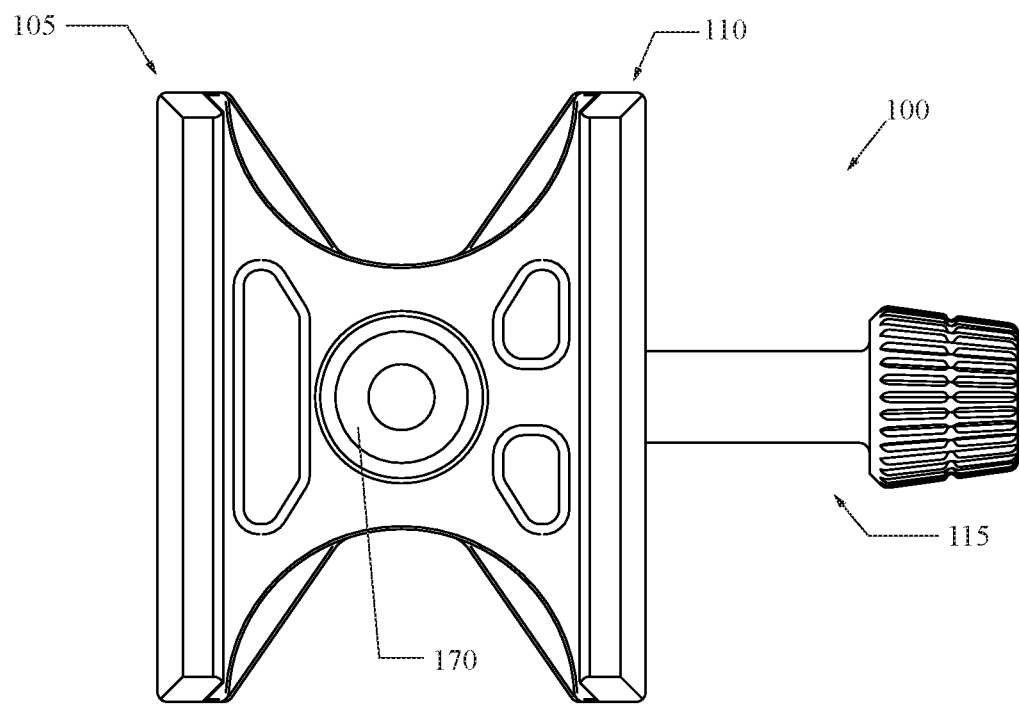
FIG. 20A shows an exemplary top view of one embodiment of the universal tripod system.
Figure 20B:
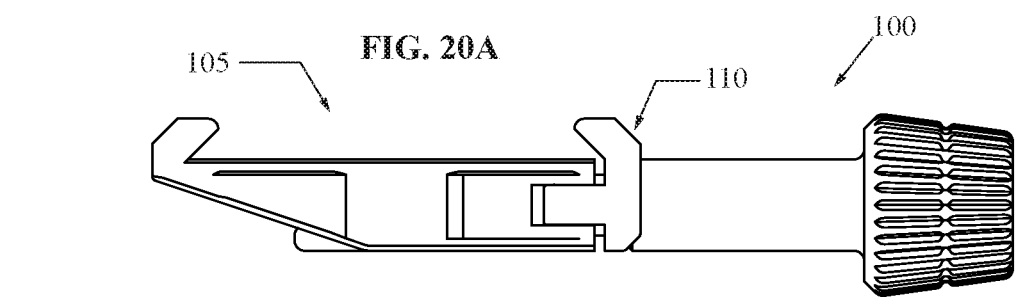
FIG. 20B shows an exemplary right view of one embodiment of the universal tripod system.
Figure 20C:
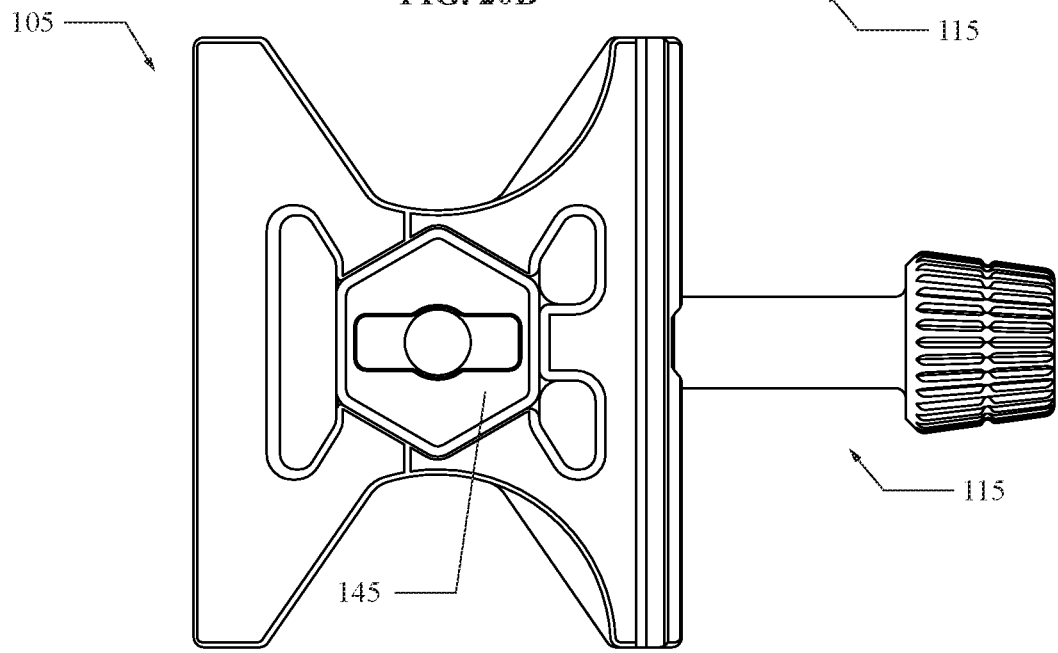
FIG. 20C shows an exemplary bottom view of one embodiment of the universal tripod system.
Figure 21A:
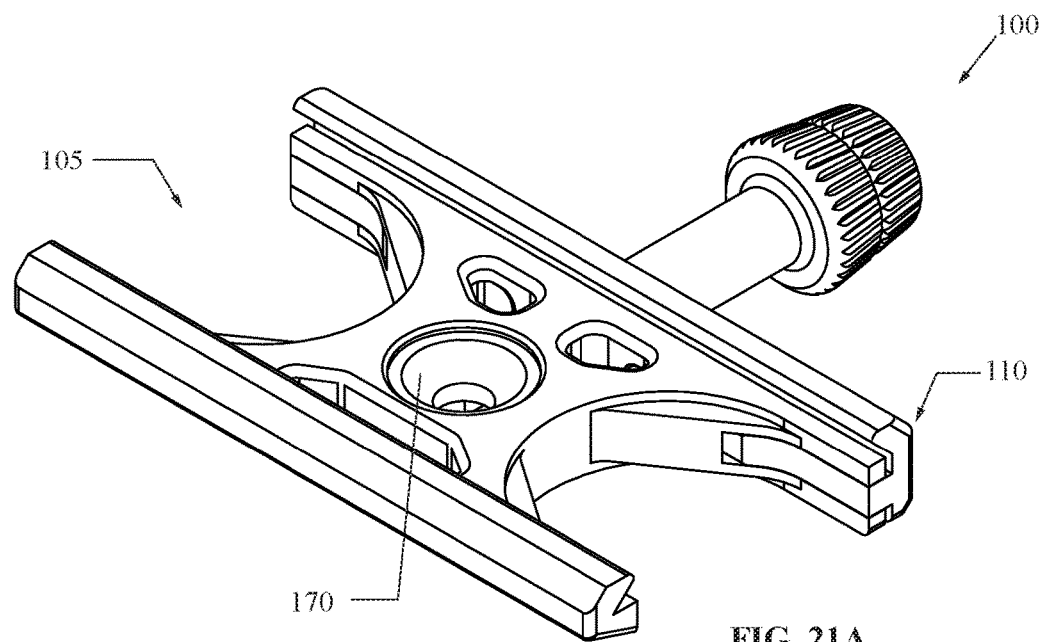
FIG. 21A shows an exemplary perspective view of one embodiment of the universal tripod system.
Figure 21B:
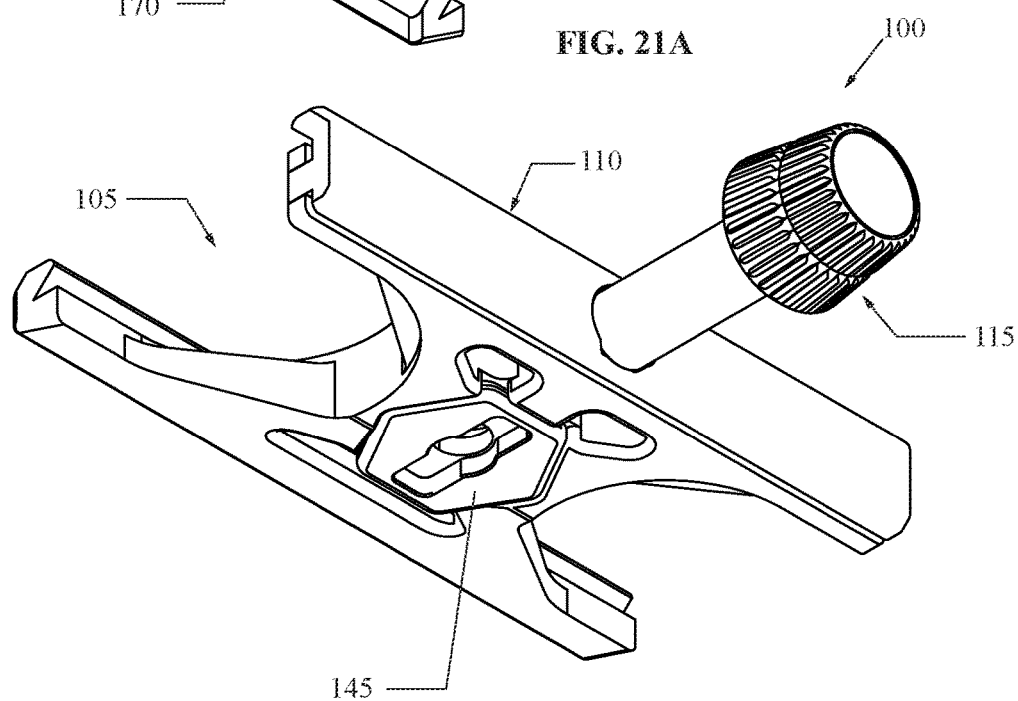
FIG. 21B shows an exemplary perspective view of one embodiment of the universal tripod system.
Figure 22A:
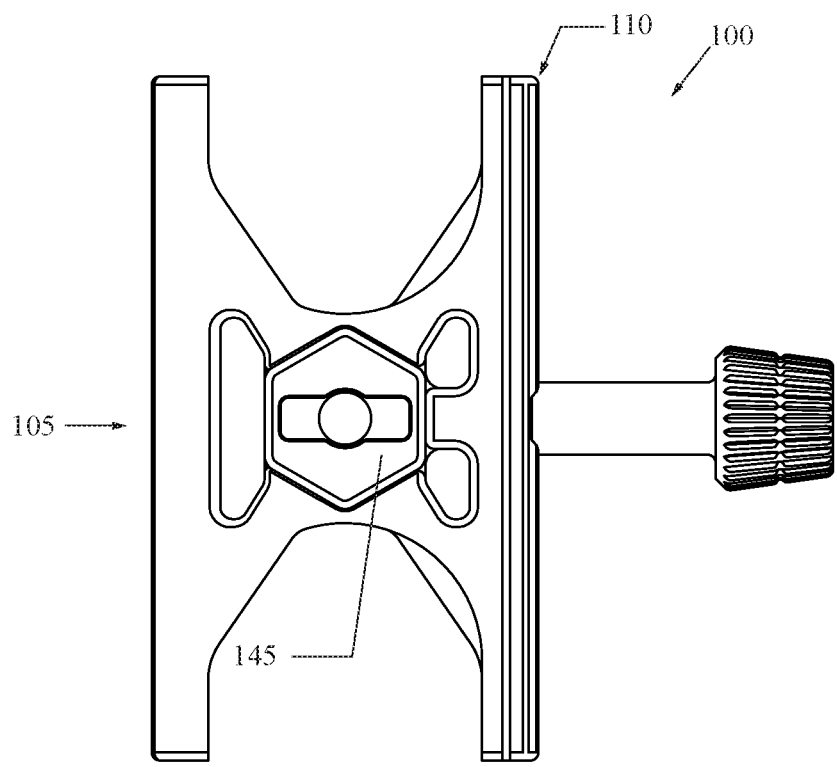
FIG. 22A shows an exemplary top view of one embodiment of the universal tripod system.
Figure 22B:
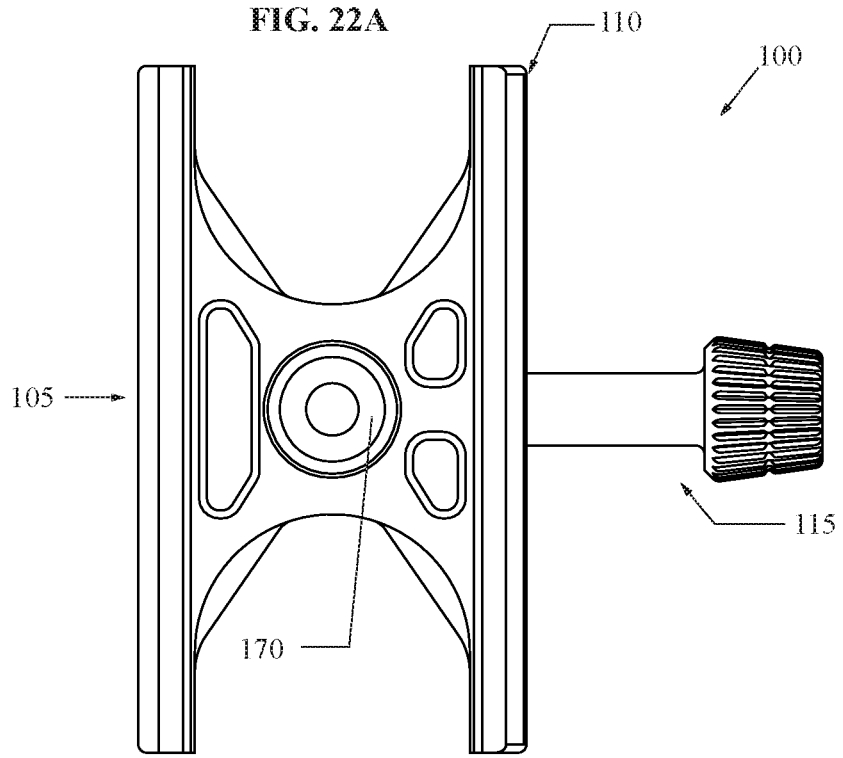
FIG. 22B shows an exemplary bottom view of one embodiment of the universal tripod system.

As shown in FIGS. 17A, 17B, 18A-18C, 19A, 19B, 20A-20C, 21A, 21B, 22A 22B, and 23 the universal tripod clamp system 100 is configured in different embodiments to match commercially available mounting plate sizes of different dimensions without limitation, such as 40 mm, 60 mm, and 85 mm. FIGS. 17A-B illustrate an embodiment of the universal tripod clamp system 100 without the bottle opener and is configured for use with mounting plates comprising about 40 mm in width, and more specifically 38 mm in width. FIGS. 19A, 19B, and 20A-20C illustrate an embodiment of the universal tripod clamp system 100 without the bottle opener and configured for use with mounting plates comprising about 60 mm in width. FIGS. 21A, 21B, 22A, and 22B illustrate an embodiment of the universal tripod clamp system 100 without the bottle opener and configured for use with mounting plates comprising about 85 mm in width. It should be understood, that these are merely examples and the universal tripod clamp system 100 can be utilized with other sizes.

In some embodiments, mounting plates for use with the universal tripod clamp system 100 may further comprise biasing members being at least one a member of a connection set consisting of: a slot, a rail, a joint, a magnet, an elastic member, a snap-fit, a clamp, a clip, and a fastener. In other embodiments, the rail and the joint of the connection set are chosen from, by way of non-limiting example, a rail set consisting of: a dovetail rail, a tongue and groove joint, a linear guide rail, a dado joint, and a dovetail joint. In other embodiments, the base member 105 and/or the clamp 110 may include at least one member of the connection set.

In some embodiments, it may be desirable that the universal tripod clamp system 100 further comprises at least one member of an identification set consisting of: an alphanumeric identification, the user's name, a symbolic shape, a company brand, a numeric identification number, a QR code, a barcode, an RFID tag, or any combination thereof.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step" for performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A universal tripod clamp system comprising:
a base member having a top side and a bottom side, wherein the top side includes a plate receiving area configured to accept a mounting plate in conjunction with camera equipment, and wherein the bottom side includes an adapter receiving port having a first shape;
a clamp configured to alter the plate receiving area; and,
an adapter removably positioned in the adapter receiving port, wherein the adapter is configured to receive a portion of a tripod head.

2. The universal tripod clamp system of claim 1, wherein the adapter includes an opening having a second shape configured to conform to the portion of the tripod head.

3. The universal tripod clamp system of claim 2, wherein the portion of the tripod head is a ball head.

4. The universal tripod clamp system of claim 2, wherein the adapter is interchangeable with additional adapters, wherein each adapter is configured to receive a ball head of a number of different manufacturers, such that the universal tripod clamp system may be used with the number of different manufacturers.

5. The universal tripod clamp system of claim 2, wherein the opening includes a chamfer on the top side of the base member.

6. The universal tripod clamp system of claim 5, wherein the bottle opener is positioned on the bottom side of the base member.

7. The universal tripod clamp system of claim 5, wherein the bottle opener is positioned on a side portion of the base member.

8. The universal tripod clamp system of claim 1, wherein the adapter receiving port includes an opening disposed centrally and extending through the base member.

9. The universal tripod clamp system of claim 1, wherein the adapter is sized and shaped to substantially match the first shape of the adapter receiving port.

10. The universal tripod clamp system of claim 1, wherein the base member includes a bottle opener.

* * * * *